United States Patent
Wygnanski

(10) Patent No.: US 9,068,480 B2
(45) Date of Patent: Jun. 30, 2015

(54) ROTARY ELECTROMAGNETIC ACTUATOR

(75) Inventor: Wladyslaw Wygnanski, Cambridgeshire (GB)

(73) Assignee: Camcon Auto Limited, Cambridge (GB)

( * ) Notice: Subject to any disclaimer, the term of this patent is extended or adjusted under 35 U.S.C. 154(b) by 434 days.

(21) Appl. No.: 13/510,298

(22) PCT Filed: Nov. 16, 2010

(86) PCT No.: PCT/GB2010/051908
§ 371 (c)(1),
(2), (4) Date: Aug. 8, 2012

(87) PCT Pub. No.: WO2011/061528
PCT Pub. Date: May 26, 2011

(65) Prior Publication Data
US 2012/0293051 A1    Nov. 22, 2012

(30) Foreign Application Priority Data

Nov. 18, 2009 (GB) .................................. 0920152.6
Feb. 16, 2010 (GB) .................................. 1002604.5

(51) Int. Cl.
*F01L 9/04* (2006.01)
*F01L 1/30* (2006.01)
*F01L 1/08* (2006.01)
*F01L 1/18* (2006.01)

(52) U.S. Cl.
CPC . *F01L 1/185* (2013.01); *F01L 1/30* (2013.01); *F01L 9/04* (2013.01); *F01L 2009/0411* (2013.01)

(58) Field of Classification Search
USPC ............. 123/90.11; 74/567, 569; 251/129.01, 251/129.11, 129.13, 129.15
See application file for complete search history.

(56) References Cited

U.S. PATENT DOCUMENTS 5,873,335 A * 2/1999 Wright et al. .............. 123/90.11
6,971,628 B2  12/2005 Ichimaru
(Continued)

FOREIGN PATENT DOCUMENTS

CA  2 227 124 A1  9/1999
EP  1 457 645 A1  9/2004
(Continued)

OTHER PUBLICATIONS

European Patent Office, International Search Report, International Application No. PCT/GB2010/051908, mailed Aug. 2, 2011 (6 pages).
(Continued)

*Primary Examiner* — Burton Mullins
(74) *Attorney, Agent, or Firm* — Wood, Herron & Evans, LLP

(57) ABSTRACT

A rotary electromagnetic actuator is provided which is suitable for opening and closing a valve for example. The actuator comprises a rotor (10), a stator (16), and a biasing arrangement (20, 100, 102, 104, 106) for applying a torque to the rotor during at least part of its rotation. A plurality of stable rest positions (200; 316, 318; 400) for the rotor are defined by forces acting on the rotor and the actuator is controllable to move the rotor from one stable rest position to another. The torque applied by the biasing arrangement varies with the rotational position of the rotor such that at a primary rest position and at least a second rest position, it is sufficiently low to enable selection of those positions, and then it increases beyond the second rest position.

18 Claims, 17 Drawing Sheets

(56) References Cited

U.S. PATENT DOCUMENTS

| | | | |
|---|---|---|---|
| 7,047,922 B2* | 5/2006 | Asada et al. | 123/90.16 |
| 7,588,002 B2* | 9/2009 | Wygnanski et al. | 123/90.11 |
| 7,753,015 B2* | 7/2010 | Seethaler et al. | 123/90.15 |
| 2006/0016408 A1 | 1/2006 | Gaubatz et al. | |
| 2006/0278190 A1 | 12/2006 | Meyer | |

FOREIGN PATENT DOCUMENTS

| | | | | |
|---|---|---|---|---|
| WO | 03/016683 A1 | 2/2003 | | |
| WO | 2004/097184 A1 | 11/2004 | | |
| WO | 2011061528 | * | 5/2011 | F01L 1/185 |

OTHER PUBLICATIONS

European Patent Office, Written Opinion of the International Searching Authority, International Applicatino No. PCT/GB2010/051908, mailed Aug. 2, 2011 (12 pages).

ESPACENET, Machine Generated English Translation of WO 03/016683, retrieved from http://translationportal.epo.org/emtp/translate/?ACTION=description-retrieval&COUNTRY=WO&FORMAT=docdb&KIND=A1&LOCALE=en_EP&NUMBER=03016683&OPS=ops.epo.org&ENGINE=google&SRCLANG=de&TRGLANG=en on May 4, 2012 (11 pages).

ESPACNET, Machine Generated English Translation of EP 1 457 645 A1, retrieved from http://translationportal.epo.org/emtp/translate/?ACTION=description-retrieval&COUNTRY=EP&FORMAT=docdb&KIND=A1&LOCALE=en_EP&NUMBER=1457645&OPS=ops.epo.org&ENGINE=google&SRCLANG=de&TRGLANG=en on May 4, 2012 (8 pages).

Japanese Patent Office, Examination Report, Patent Application No. JP2012-539412, mailed Jan. 20, 2015 (6 pages).

Japanese Patent Office, English Translation of Examination Report, Patent Application No. JP2012-539412, mailed Jan. 20, 2015 (9 pages).

* cited by examiner

ROTARY ELECTROMAGNETIC ACTUATOR

FIELD OF THE INVENTION

The present invention relates to rotary electromagnetic actuators. More particularly, it relates to an electromagnetic actuator suitable for opening and closing a valve.

BACKGROUND OF THE INVENTION

An electromagnetic actuator configuration at which the present invention is directed is described in International Publication No. WO2004/097184 (filed by the present applicant), the contents of which are incorporated herein by reference. The present invention seeks to provide improvements to this actuator arrangement.

An actuator configuration described in this publication is shown in present FIGS. 1A and 1B. They show front and rear perspective views respectively. A rotor 10 is rotatably mounted in a housing 12 for rotation about an axis 14. It is surrounded by a stator 16 comprising eight poles. A respective winding 18 is wound around each pole.

A lever 20 is pushed on to the cam surface 24 of a cam 22 by a leaf spring 26. Cam surface 24 is cylindrical and eccentrically mounted on the rotor with respect to the rotor's axis 14. The actuator is coupled to a valve stem 30. It is arranged such that maximum deflection of the leaf spring 26 occurs when the valve stem 30 is at the upper end of its vertical travel, that is, in the valve closed position.

The coupling between the actuator and valve stem 30 is visible in FIG. 1B. A crank pin 40 extends from the rear of the rotor, through a lever 42. Lever 42 is mounted so as to be pivotal about an axis 44. The crank pin 40 passes through an aperture defined by lever 42, the wall of which defines a cam surface 46. This follows the movement of the crank pin as it rotates, converting this rotational movement into substantially vertical oscillation of the valve stem 30 via pivotable coupling 48, providing desmodromic valve control.

The passive magnetic forces between the rotor and stator serve to define eight stable rest positions for the rotor. In each rest position, the rotor is firmly held in position by these passive magnetic forces without requiring the input of energy (such as an electric current though the stator windings).

The rotor can be rotated from one rest position to another by applying a suitable current pulse to one or more stator windings. The eight windings (or coils) are connected together in four pairs, with each pair consisting of two windings on opposite sides of the rotational axis 14. The windings in each pair may be connected together in series or in parallel.

The actuator is controllable to energise one pair, or two pairs, or all four pairs of windings depending on the magnitude of the required impulse. This can vary substantially depending on a range of factors such as engine speed, valve stiffness, oil viscosity, and temperature, for example.

The leaf spring stores energy as the valve stem moves into its closed position. This energy is then used to accelerate the rotor when it moves away from this primary rest position by virtue of the action of the spring 26 on the rotor via lever 20 and cam 22. This may substantially reduce the peak electric current required to shift the rotor in the direction away from its rest position. As noted above, rotation of the rotor is converted into movement of the valve stem via the linkage shown in FIG. 1B.

As the valve stem moves back towards its closed position, the leaf spring serves to control and reduce its speed as it approaches its seat. This helps to reduce engine noise and increase the life of the engine. At the same time, kinetic energy is stored in the spring for reuse during the valve opening phase.

SUMMARY OF THE INVENTION

According to one aspect of the present invention, an electromagnetic actuator comprises:
 a rotor;
 a stator, with the rotor arranged for rotation in the stator;
 a biasing arrangement for applying a torque to the rotor during at least part of its rotation,
 wherein a plurality of stable rest positions for the rotor are defined by forces acting on the rotor, and the actuator is controllable to move the rotor from one stable rest position to another, and
 the torque applied by the biasing arrangement varies with the rotational position of the rotor such that at a primary rest position and at least a second rest position it is sufficiently low to enable selection of those positions, and then it increases beyond the second rest position.

In some configurations in accordance with the arrangements shown in FIGS. 1A and 1B, it was found that the initial acceleration of the rotor away from its primary rest position resulting from the force exerted by the leaf spring was too great to enable the rotor to be reliably moved from its primary rest position to the next, immediately adjacent rest position on either side.

This issue is addressed by the present invention by configuring the biasing arrangement in such a way that the torque it applies at a primary rest position and at least a second rest position is sufficiently low to enable selection of those positions. Those rest positions may remain sufficiently well defined by the passive magnetic forces acting between the rotor and stator notwithstanding the torque (if any) applied by the biasing arrangement over the associated portion of a revolution of the rotor.

In embodiments of the present invention, the bias arrangement is a mechanical biasing arrangement, including a resilient element for example. Preferably it comprises a bias cam defining a bias cam surface and a bias cam follower, with the bias cam follower and bias cam surface urged together, and one of the bias cam and the bias cam follower being rotatable with or by the rotor.

The bias cam surface may be profiled such that there is substantially no movement of the bias cam follower between a primary rest position and the second rest position. Thus, during this movement, the biasing force applied to the rotor by the biasing arrangement is substantially unchanged relative to the primary rest position.

Furthermore, the biasing arrangement is configured such that substantially no accelerating torque is applied to the rotor by the biasing arrangement during this movement. The force applied by the arrangement may be directed towards the axis of rotation of the rotor during this part of the rotor's rotation to minimise any associated torque.

The remainder of the bias cam surface may be profiled as required so that the biasing arrangement provides the desired torque during appropriate portions of the rotation of the rotor.

The availability of stable rest positions corresponding to part rotation of the rotor away from its primary rest position may be particularly beneficial when the actuator is employed to operate a valve. With the primary rest position corresponding to the valve closed position, and 180° rotation of the rotor corresponding to the valve fully opened position, the intermediate stable rest positions represent partial opening of the valve. The actuator may be controllable to oscillate between the primary rest position and one or more of these intermediate rest positions. When the actuator is employed to open and close an inlet or an exhaust valve of an internal combustion engine, this intermediate oscillation may provide idling, cruising or other modes of operation with lower fuel consumption. The present invention may be employed to ensure that all the required intermediate stable rest positions are available for selection.

The primary rest position and second rest position may be adjacent stable rest positions of the rotor (that is, there may be no intervening rest positions defined by the passive magnetic forces exerted on the rotor by the stator). In some configurations, there may be one or more further rest positions between the primary rest position and second rest position.

The primary and second rest positions may be defined by magnetic forces acting only on the rotor (preferably due to interaction between the rotor and the stator) with substantially no torque being applied to the rotor by the biasing configuration in either of these positions (or between them preferably).

The actuator may be controllable to move the rotor from one rest position to another by application of an appropriate impulse towards the other rest position caused by current flowing through at least one of the stator windings. This action may be sufficiently repeatable and reliable that the impulse needs to be applied in one rotational direction only, and may only consist of a single pulse of a predetermined magnitude, thereby minimising energy consumption.

In further embodiments, the displacement of the bias cam follower is substantially constant between the primary rest position and a third rest position, located on the rotationally opposite side of the primary rest position to the second rest position. Preferably, the third rest position is the next, adjacent rest position in this opposite direction of rotation away from the primary rest position.

In preferred embodiments of the present invention, the force applied by the biasing arrangement on the rotor varies with the rotational position of the rotor such that it is at or close to its minimum at and between the primary and secondary rest positions. It has been determined that in some actuator applications, it is advantageous for there to be no (or only relatively low) bias applied at the primary and a second rest position with an increased biasing force only being applied over part of the rotor's revolution beyond the second rest position.

One particular application for the actuator where this configuration is preferred is its use to control a valve of a car engine. For the majority of the life of such an engine, it operates in low and medium rpm ranges. It has been found that application of a significant biasing force on the rotor may not be required during these modes of operation. It is still though beneficial for a biasing arrangement to provide an energy storage and acceleration function when the engine is operating at relatively high rpm. However, during low and medium engine speed ranges, accurate valve timing can be reliably achieved without this additional torque.

A substantial force is likely to be needed to store a meaningful amount of energy in the biasing arrangement, particularly if there is only a small space available for displacement of a mechanical energy storage element. This requirement for a substantial force means that there is likely to be substantial friction exerted on the rotor by the biasing arrangement and may also lead to a relatively short lifetime for a mechanical energy storage element. Therefore, it is advantageous if the force applied by the biasing arrangement is at or substantially at its minimum at and between the primary and secondary rest positions, with the force increasing beyond the second rest position. This significantly reduces the amount of friction generated during low and medium rpm operation and increases the lifetime (and hence the reliability) of a mechanical energy storage element in the biasing arrangement.

In such an embodiment, the biasing arrangement may be configured to store energy during a portion of travel of the rotor beyond the second rest position, and then use the stored energy to accelerate the rotor in the same direction as it returns to its primary rest position. The actuator may be arranged and controlled such that this energy recycling is implemented only during high rpm operation of an associated engine.

Thus, during low and medium rpm ranges, rotation of the rotor may be restricted to the portion of a revolution which does not involve energy storage, and during high rpm operation, the rotor is controlled to rotate beyond this portion and through the energy storage portion of the revolution. In particular, during high rpm, the rotor preferably rotates continuously, in the same direction, through complete revolutions passing through the energy storage region.

An impeller may be coupled to the rotor via a linkage. More particularly, the linkage may be arranged such that the impeller is in a first impeller position when the rotor is in its primary rest position, and is at or close to its maximum displacement from the first impeller position when the rotor is in its second rest position. Thus, rotation of the rotor from its primary to its second rest position may result in full displacement of the impeller from its primary rest or home position to its maximum displacement at the second rest position without the force applied by the biasing arrangement significantly increasing beyond its minimum. For example, the actuator may be provided in an engine such that the impeller's first position corresponds to a valve closed position and the second rest position corresponds to the valve fully open position.

Reciprocation of the impeller may therefore be achieved by actuating the actuator such that its rotor rotates from its primary rest position to its second rest position and then back again in the opposite direction. Furthermore the linkage may be arranged such that the impeller returns to the first impeller position during rotation of the rotor beyond the second rest position. Thus, rotation of the rotor in the same direction would result in reciprocation of the impeller from its first position to a second position and then back again. This may take place over 270° rotation of the motor or less, or preferably 180° rotation or less. Reciprocation of the rotor over less than a complete revolution of the rotor facilitates a quicker reciprocating action.

Preferably, in embodiments where the linkage is arranged such that the impeller returns to the first impeller position during rotation of the rotor beyond the second rest position, this return to the second rest position occurs before the rotor reaches the portion of its travel during which the biasing arrangement stores energy. Thus, full reciprocation of the impeller may be achieved by rotating the rotor in the second direction without the rotation being materially impeded as a result of energy transfer to the biasing arrangement.

In this implementation, there are two rotational positions of the rotor at which the impeller is in the first impeller position. The actuator may be configured such that there are one or more intermediate stable rest positions defined between these positions and the stable rest position at which the maximum displacement of the impeller is achieved. The impeller's displacement corresponding to the intermediate rest positions may be different depending on which first impeller position is selected. Reciprocation between a selected first rest impeller position and an associated immediate rest position will therefore provide reciprocation with a selected degree of impeller displacement.

The bias cam follower and bias cam surface may be urged together by a biasing element which is configured to store energy during a portion of the travel of the rotor towards its primary rest position and to use this stored energy to accelerate the rotor during a portion of its travel away from the primary rest position. This provides energy storage and release during operation of the actuator and the bias cam surface may be profiled in accordance with the present invention to control this process whilst facilitating selection of required intermediate rest positions.

According to a further aspect, the present invention provides an electromagnetic actuator comprising:
a rotor;
a stator, with the rotor arranged for rotation in the stator; and
an impeller coupled to the rotor for displacement as the rotor rotates,
wherein a plurality of stable rest positions for the rotor are defined by forces acting on the rotor, and the actuator is controllable to move the rotor from one stable rest position to another,
and the displacement of the impeller resulting from movement of the rotor from a primary rest position to a second rest position is greater than the displacement resulting from movement of the rotor from the primary rest position to a third rest position, with the rotation of the rotor from the primary rest position to the second rest position and from the primary rest position to the third rest position being substantially equal and in opposite directions.

In the valve actuator configurations described in WO2004/097184, the movement imparted by the actuator to a valve stem for example is related to the rotational angle of the rotor in the same way whether it moves away from its primary rest position in a clockwise or anti-clockwise direction. The inventor has realised that increased versatility of operation may be provided by making the actuation cam surface profile dissimilar in opposite directions of rotation. In this way, the displacement of the impeller following rotation through a given angle to a stable rest position in one direction may be different to that resulting from rotation of the rotor through the same angle in the opposite direction. This means that either displacement may be selected by controlling the actuator so as to rotate the rotor in the respective direction.

In a preferred embodiment, the impeller is coupled to the rotor via a linkage, the linkage being arranged such that in use over the lost motion portion of the rotation of the rotor, there is substantially no displacement of the impeller, with the lost motion portion including the primary rest position and being located asymmetrically with respect to the primary rest position. As a result of this asymmetry, a larger proportion of the motion resulting from movement of the rotor from the primary rest position to the third rest position is "lost" relative to the movement resulting from rotation from the primary rest position to the second rest position. This leads to different displacements of the impeller resulting from movement to the second rest position and the third rest position, respectively.

The linkage may be arranged to "absorb" the lost motion over the lost motion portion of the rotor rotation. It may comprise a resilient coupling between the rotor and the impeller which is extended over the lost motion portion. Thus, over the lost motion portion, rotation of the rotor results in extension of the resilient coupling, rather than displacement of the impeller. As well as providing the desired "lost motion", the resilient coupling provides a greater tolerance in the construction of the linkage and/or components coupled to the actuator. It can compensate for changes in dimensions of components resulting from thermal expansion or contraction, and wear and tear over the lifetime of the actuator. Also, during the lost motion portion, it exerts a tensile force on the impeller urging it towards (and so restraining it in) its end of travel position.

Alternatively, the resilient coupling may be arranged to be compressed over the lost motion portion of the rotor rotation. In this case, if the impeller is prevented from reaching its end of travel position further from the rotor, the coupling is compressed and exerts a compressive force on the impeller.

In one implementation, the linkage includes a crank coupled to an off-axis location on the rotor which is rotationally offset from one extreme of its travel relative to the impeller when the rotor is in its primary rest position. This configuration, particularly in combination with a resilient coupling between the rotor and the impeller, provides a cost-effective linkage that provides the desired relationship between motion of the rotor and the impeller.

In further embodiments, the actuator comprises an actuation cam defining an actuation cam surface and an actuation cam follower associated with the actuation cam surface, with one of the actuation cam and the actuation cam follower being rotatable with or by the rotor, and the actuator being arranged such that displacement of the actuation cam follower results in displacement of the impeller. Preferably the actuation cam forms the impeller.

Preferably, the stable rest positions of the rotor are defined by mechanical biasing forces acting on the rotor and/or passive magnetic forces exerted on the rotor by the stator. The rotor may comprise a permanent magnet, and the stator may have at least one winding magnetisable by causing a current flow through the winding to urge the rotor to move from one rest position to another.

The primary rest position may define one end of the travel of the bias cam follower and/or actuation cam follower. In implementations where the actuator is coupled to a valve stem, the primary rest position may correspond to the valve closed position of the stem, for example.

The present invention further provides a method of operating an actuator as described herein, comprising the step of oscillating the rotor back and forth between the primary rest position and another rest position. According to a further mode of operation embodying the present invention, the rotor is rotated from the primary rest position back to the primary rest position by rotation of the rotor through a complete revolution in one direction. This may facilitate high speed operation of the actuator as it is not necessary to reverse its direction of motion to return its primary rest position.

The rotor may be controlled to pause for a short dwell time at any rest position.

A further preferred control protocol comprises rotating the rotor from the primary rest position to another rest position, pausing at said another rest position, and then continuing rotation of the rotor in the same direction back to the primary rest position.

The biasing element is preferably mechanical and may be in the form of a spring arrangement, for example a leaf spring.

BRIEF DESCRIPTION OF THE DRAWINGS

A prior art arrangement and embodiments of the invention are described herein by way of example with reference to the accompanying schematic drawings, wherein.

DETAILED DESCRIPTION OF THE INVENTION

Figure 1A:
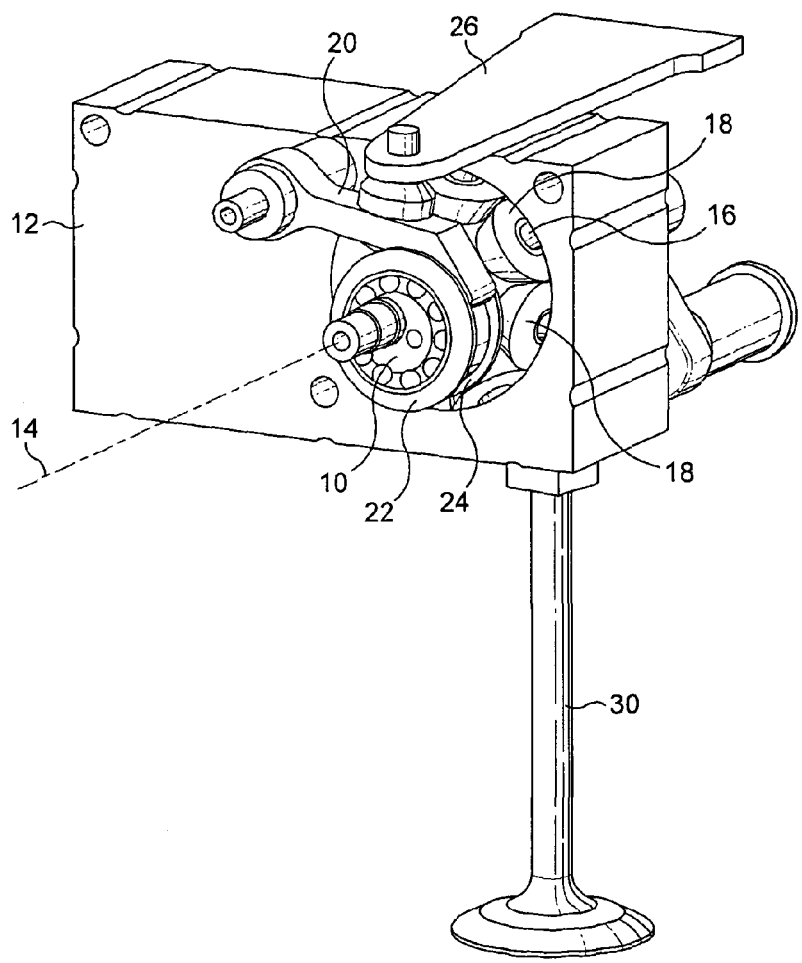
FIGS. 1A and 1B are front and rear perspective views, respectively, of a known electromagnetic actuator configuration of the form described in WO2004/097184.
Figure 1B:
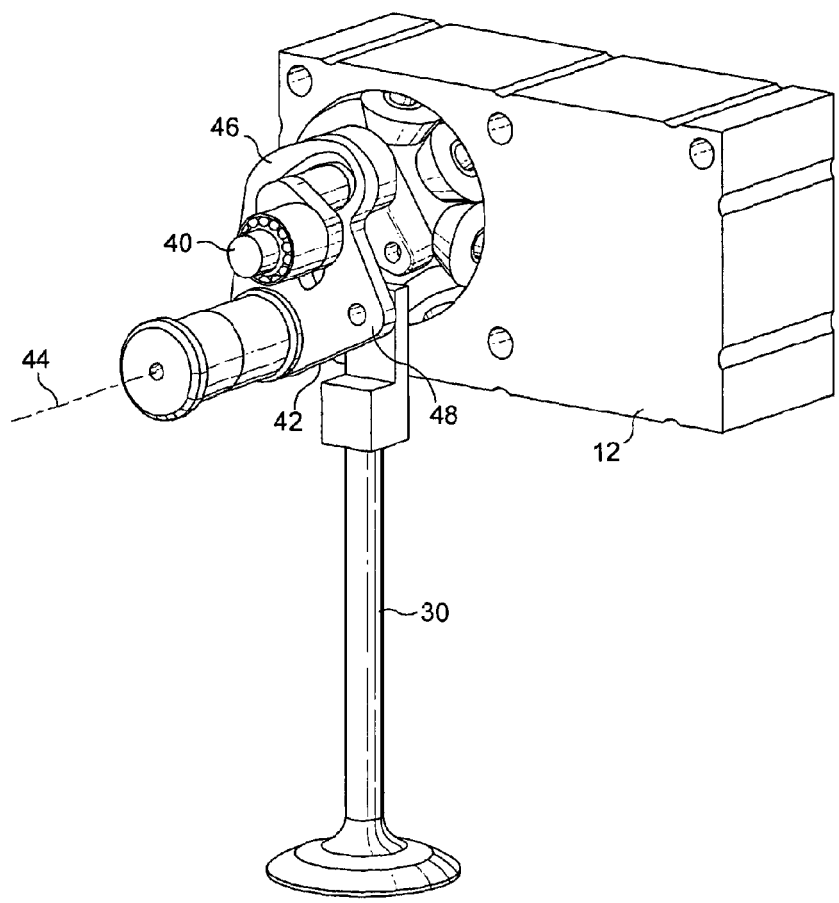
Figure 2:
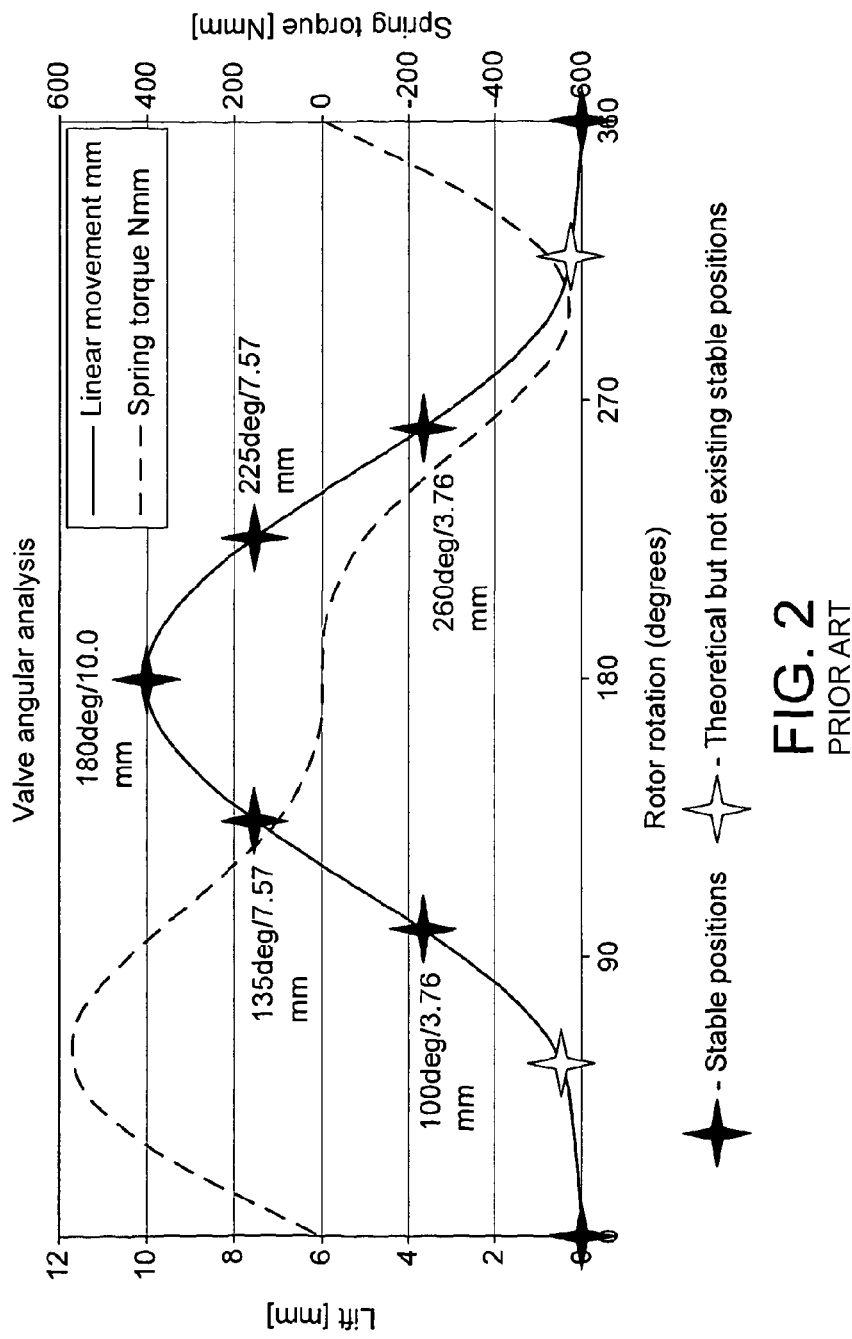
FIG. 2 is a graph of valve lift and spring torque against rotor rotation for an actuator configuration of the form shown in FIGS. 1A and 1B.

FIG. 2 represents the changes in valve lift and the torque applied to the rotor by spring 26 in a known actuator having the configuration shown in FIGS. 1A and 1B. The crosses represent stable positions defined by the actuator in absence of the spring applied torque. The 0/360° rotor position corresponds to its primary rest position. It can be seen that stable rest positions on either side of this position are close to the two maximums in the applied spring torque plot. As a result, it may not be possible to reliably operate the actuator so as to move the rotor from its primary rest position into one of these adjacent intermediate rest positions. In this event, the first stable position which may be selected is beyond 90° of rotation of the rotor away from its primary rest position, where the valve stem has already moved through more than a third of its total travel. The first intermediate stable rest positions at 45° of rotation are not available for selection.

Figure 3A:
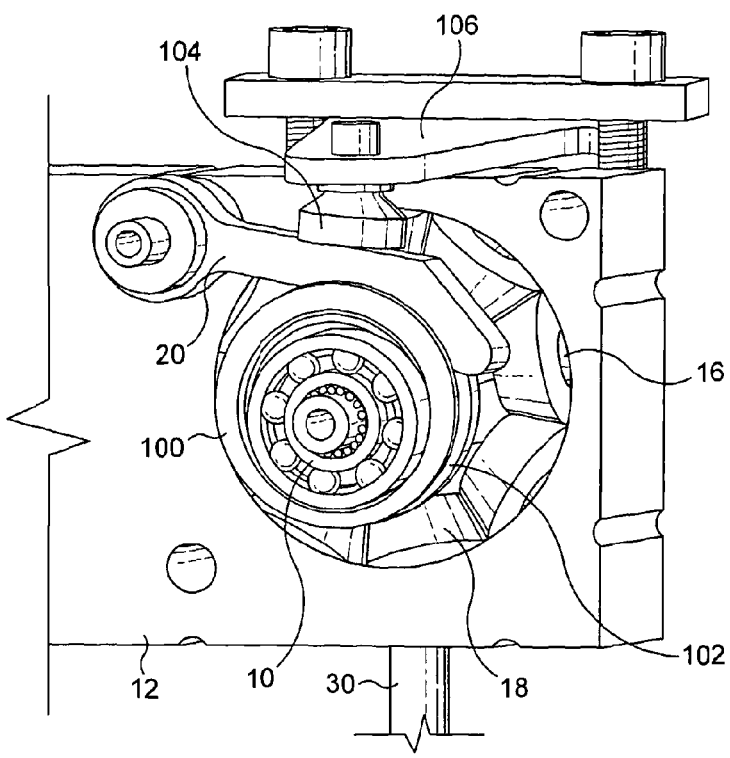
FIGS. 3A and 3B are front and rear perspective views, respectively, of an electromagnetic actuator embodying the present invention, coupled to a valve stem.
Figure 3B:
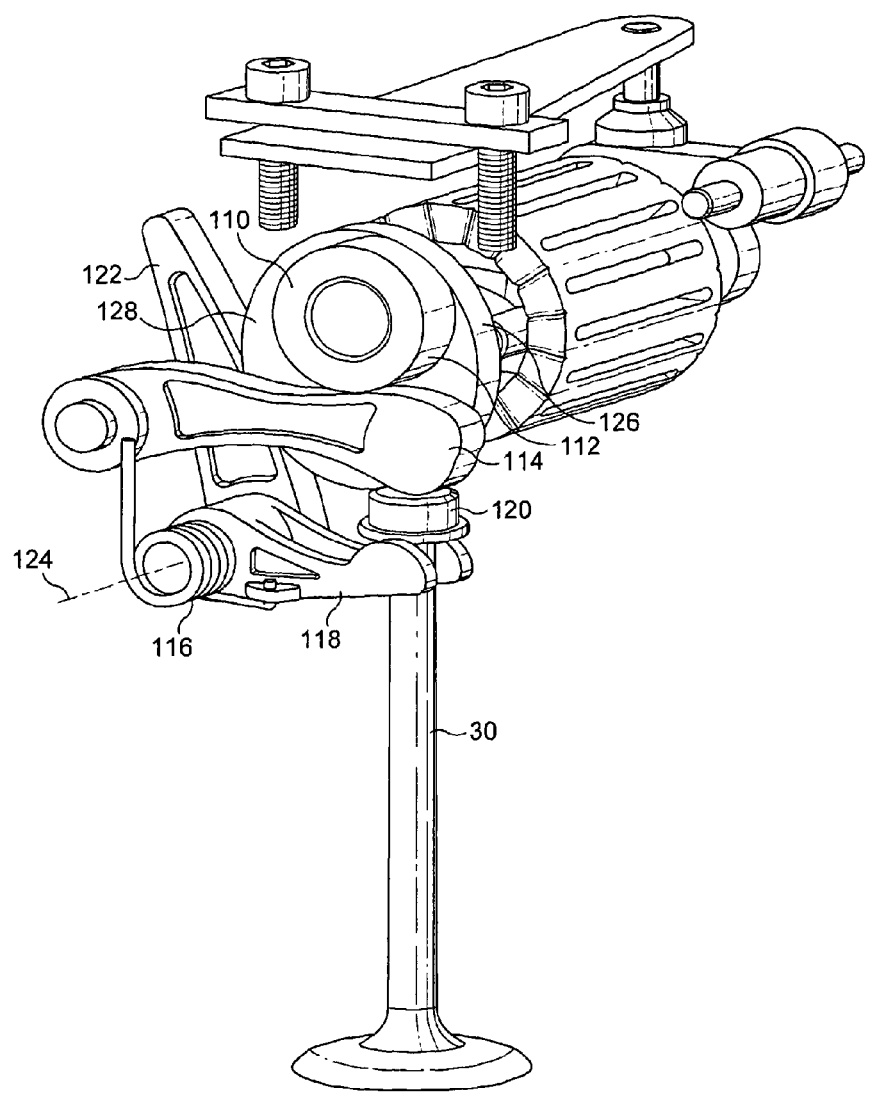

An actuator embodying the invention is depicted in FIGS. 3A and 3B. A bias cam 100 defines a bias cam surface 102. This is engaged by a bias cam follower provided by foot 104. The bias cam surface and bias cam follower are urged together by a biasing element 106 in the form of a leaf spring. Whereas the bias cam surface 24 of the known actuator configuration shown in FIG. 1A is circular in end view, bias cam surface 102 deviates from this profile as described in more detail below with reference to FIG. 4.

As can be seen in FIG. 3B, an actuation cam 110 defines an actuation cam surface 112. This surface is engaged by an actuation cam follower 114 in the form of a lever. The lever is upwardly urged against the cam surface by a spring 116. Spring 116 acts on a lever 118 which in turn urges valve stem head 120 against the underside of lever 114. The underside of the distal end of lever 114 rocks against the upper surface of the valve stem head 120 as it moves up and down and acts as an impeller. In this way, the rotation of the cam 110 and the changes in its radius are converted into displacement of the lever 114, which in turn leads to vertical displacement of the valve stem 30. The profile of the actuation cam surface 112 deviates from a circular shape in end view, as described further below with reference to FIG. 7.

Lever 118 is coupled to a pull cam follower provided by a pull cam lever 122, and both levers are pivotable about a common axis 124. Pull cam lever 122 is urged against a pull cam surface 126 defined by pull cam 128. Pull cam is mounted on the actuator rotor.

Figure 9:
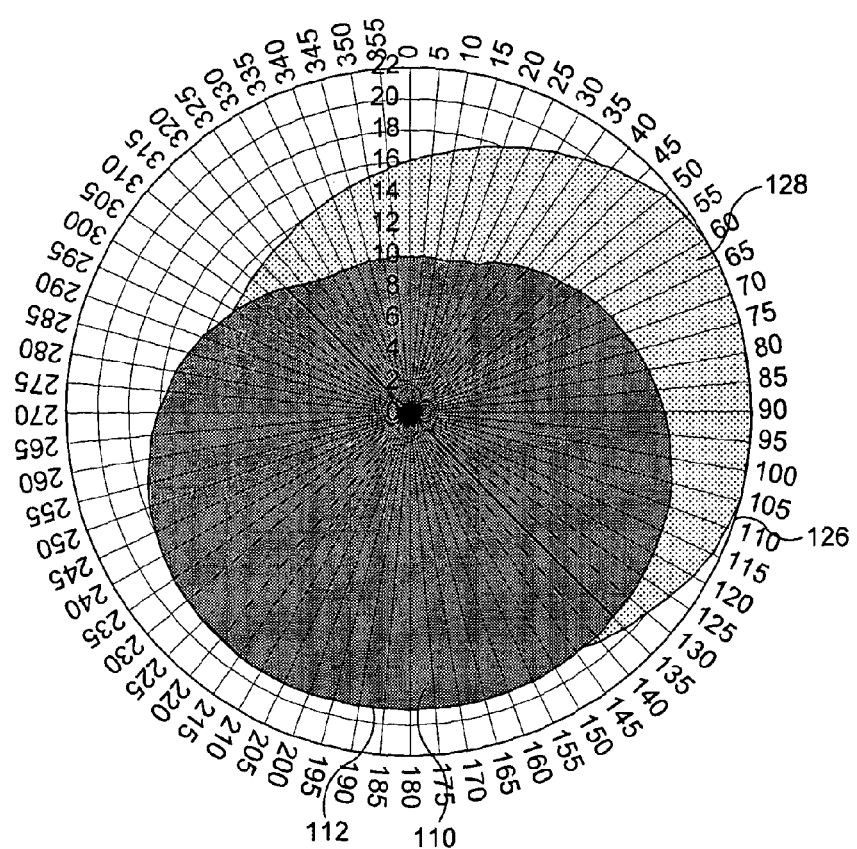
FIG. 9 represents a combination of the actuation cam surface profile of FIG. 7 with an associated pull cam surface profile.

Levers 118 and 122 are resiliently coupled together, such that the profile of the pull cam is translated into a corresponding upwards return force applied to the valve stem by lever 118, which is dependent on the rotational position of the rotor. A pull cam profile is shown in FIG. 9 by way of example, and discussed below.

Figure 4:
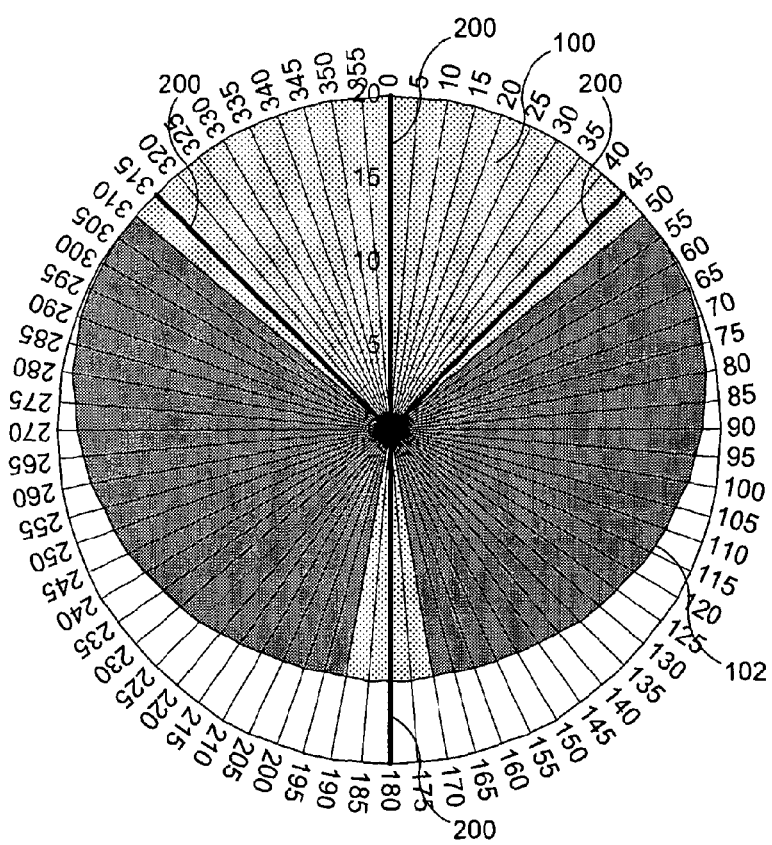
FIG. 4 represents the profile of a bias cam surface embodying the present invention.

In the symmetrical, non-circular bias cam surface profile depicted in FIG. 4, each half of the surface on either side of the line extending between 0 and 180° is divided into three zones. These zones are equal on either side and will be described with reference to the section extending in a clockwise direction between 0° and 180°.

The section between 0 and 50° is circular, as is the section between 170° and 180°. Between 50 and 170°, the profile gradually deviates inwardly from a circular shape. This results in a gradual change of a radius of 20 mm at 50° to 15 mm at 170°. The thicker radial lines at 0, 45 and 180° denote stable rest positions 200. It can be seen that the intermediate stable rest position at 45° lies within the circular zone extending from the primary rest position at 0°. Thus, as the rotor rotates from 0 to 45°, there is no displacement of a bias cam follower following the surface. There is no torque applied to the rotor by the biasing arrangement during this movement. The intermediate rest position at 45° is therefore solely defined by the magnetic forces acting between the rotor and stator. This allows it to be reliably selected during operation of the actuator. In effect, a distinct force well is defined by these magnetic forces at the 45° position so that the rotor reliably settles into this position following application of an appropriate current pulse to a stator winding to select this position.

Similarly, at the 180° position opposite the 0° primary rest position, a 20° circular zone is defined on the cam surface enabling a distinct force well to be defined at this position by magnetic forces only.

Figure 5:
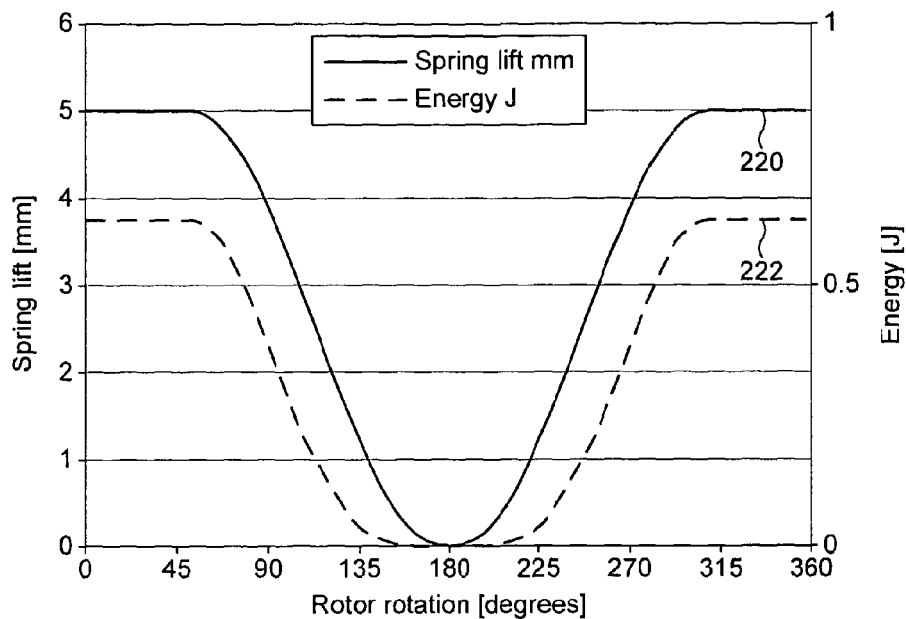
FIG. 5 is a graph of spring lift and spring energy storage against rotor rotation for an actuator having a bias cam surface profile of the form shown in FIG. 4.

In FIG. 5, a plot of spring lift 220 and spring stored energy 222 against rotor rotation is shown. It can be seen that the circular portions of the bias cam surface between 310 and 50° and 170 and 190° translate into no change in the spring lift during these portions. During the rotor rotation from 50 to 170°, there is a rapid decrease in the spring lift and energy stored, as this energy is transferred into kinetic energy of the rotor. The non-circular bias cam surface profile here causes the biasing force to be directed to one side of the rotor axis, resulting in application of a torque. Between 190 and 310°, the spring lift and stored energy increase as the rotor turns to its primary rest position, transferring kinetic energy back into potential energy in the spring.

Figure 6:
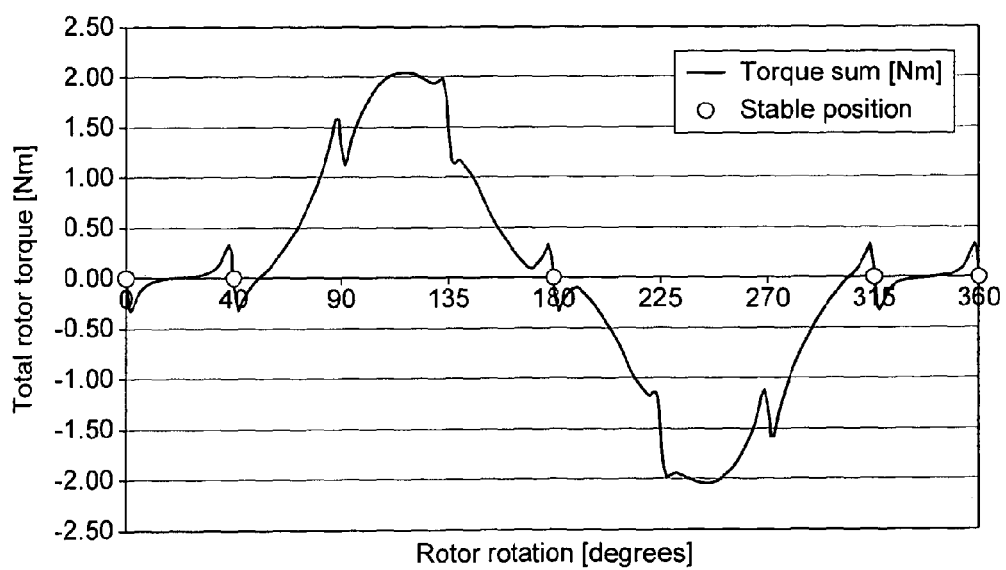
FIG. 6 is a graph of total rotor torque against rotor rotation for an actuator having a bias cam surface profile of the form shown in FIG. 4.

A plot of the total rotor torque against its rotational position is shown in FIG. 6. The total torque combines the passive magnetic torque exerted by the stator on the rotor and the spring torque exerted by the biasing arrangement embodying the present invention. Dots 224 denote stable rest positions at 0/260°, 45°, 180° and 315°. It can be seen that when the rotor is within a stable zone close to each of these positions, the resultant torque acts to urge the rotor towards the respective stable position. It will be appreciated that the actuator may be configured to increase the steepness and/or rotational extent of the stable zones to suit particular requirements.

Figure 7:
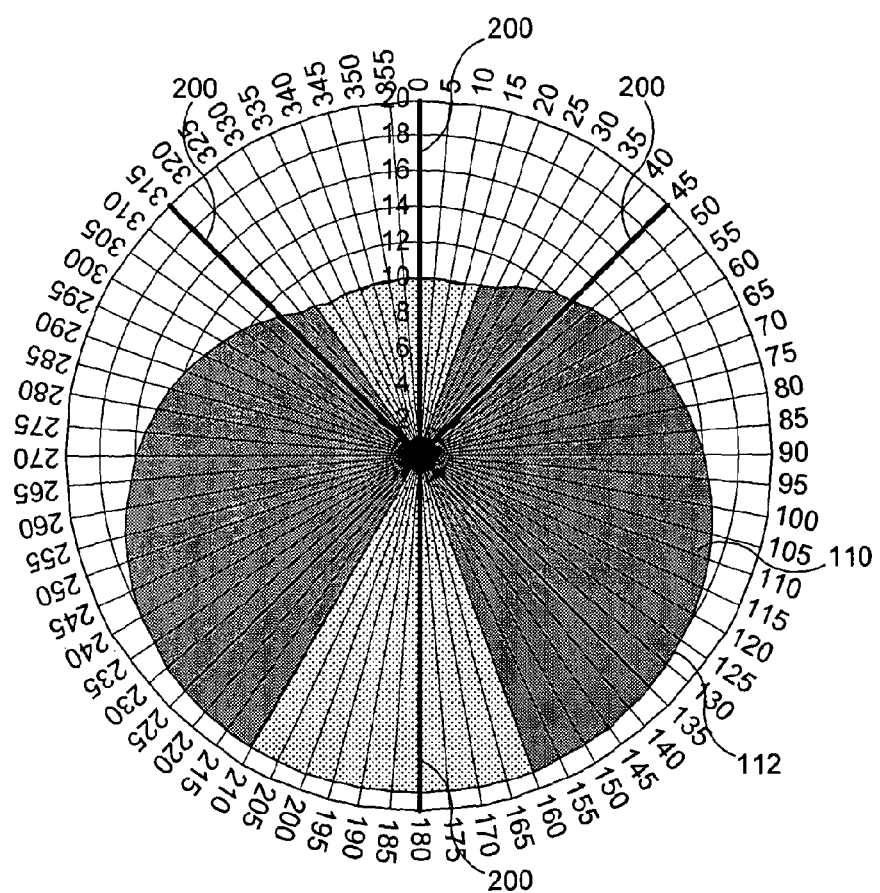
FIG. 7 represents an actuation cam surface profile embodying the present invention.

An actuation cam surface profile embodying the present invention is depicted in FIG. 7. The radius is marked in millimetres measured from the rotational centre of the cam 110.

In the uppermost zone of the cam profile in FIG. 7 extending between 330° and 20°, the radius of the cam is 10 mm and its profile is circular in end view. Thus, there is no displacement of the actuation cam follower as it moves over this zone. As a result, any small movements of the rotor as it settles into its primary rest position are not translated into vibration of the actuation cam follower, and a valve stem coupled to it for example.

Between 20° and the first intermediate stable position at 45°, the radius of the cam gradually increases. This leads to a corresponding lift in a valve stem away from its closed position.

In contrast, there is a smaller increase in the cam radius between 0° and the first intermediate rest position in the opposite direction at 315°. During operation of the actuator, this configuration enables selection of either the intermediate rest position at 45° or that at 315°, depending on the extent of displacement required. When the actuator is employed to operate a valve, this means that two different partial valve open positions may be selected from. They may correspond to 10% and 25% respectively of the total actuation cam follower displacement, for example.

Between 45° and 165° (and between 315° and 205°), the cam radius smoothly increases. The radius is constant between 165 and 205°. This zone encompasses the stable rest position at 180°. As in the primary rest position at 0°, this constant radius portion means that small movements of the rotor about the 180° position are not translated by the cam into vibration of the actuation cam follower.

Figure 8:
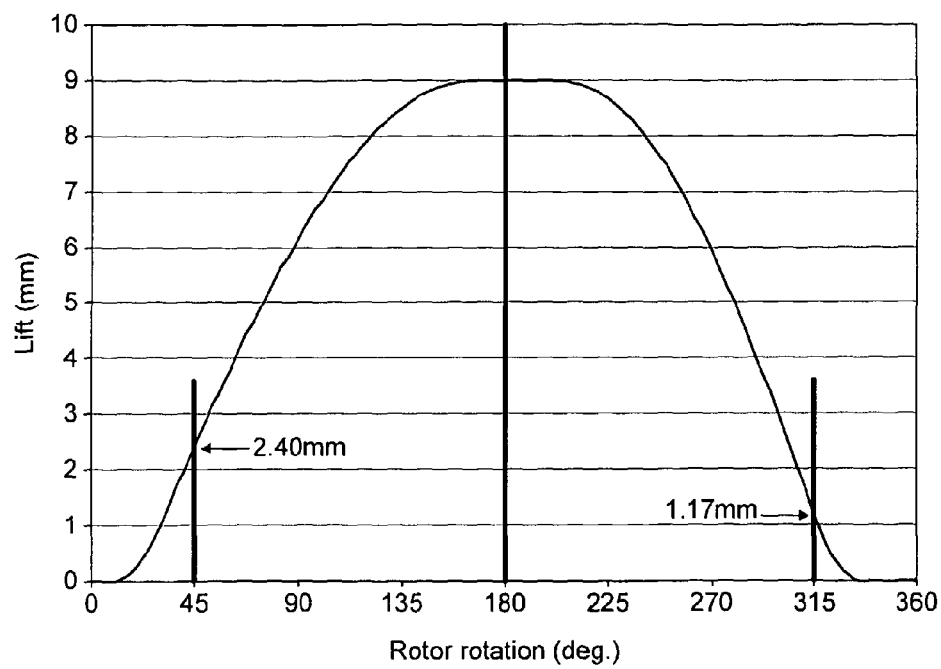
FIG. 8 is a graph of valve lift against rotor rotation for an actuator embodying the present invention.

A graph of valve lift against the rotational angle of the rotor employing an actuator having an asymmetrical actuator cam surface of the form shown in FIG. 7 is depicted in FIG. 8. It can be seen that the greater radius of the cam at the intermediate rest position at 45° leads to a greater valve lift of 2.4 mm, relative to a smaller displacement of 1.17 mm at the stable rest position at 315°. Where the actuator is employed to control a valve stem of an internal combustion engine, the smaller displacement may correspond to an idling state, with the greater displacement at 45° corresponding to a cruising engine condition, for example.

FIG. 9 shows a combination of actuation and pull cam profiles suitable for the actuator embodiment of FIG. 3B. The actuation cam surface profile corresponds to so that shown in FIG. 7. The pull cam profile is rotationally offset from the actuation cam profile by around 90°. This is because, as can be seen in FIG. 3B, the contact points for the respective cam followers 122 and 114 are correspondingly offset.

Figure 10:
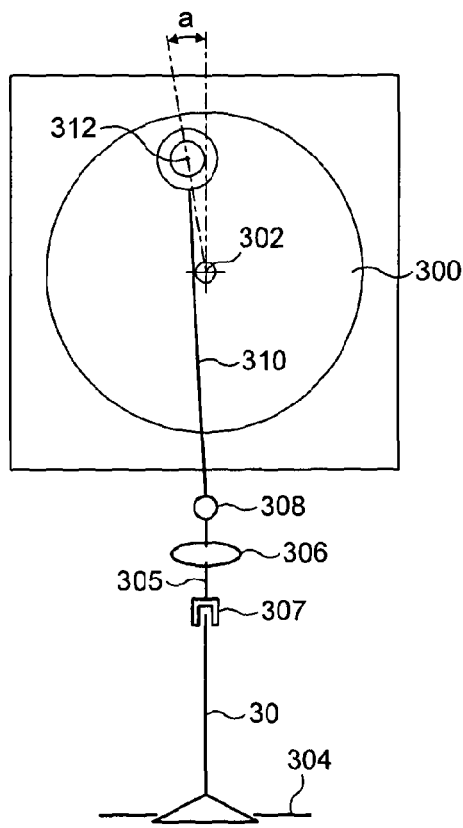
FIG. 10 is a diagrammatic rear view of a further electromagnetic actuator embodying the present invention, coupled to a valve stem.

A further embodiment is represented schematically in FIG. 10. Rotor 300 of the actuator is shown in end view, with its rotational axis 302 extending perpendicular to the plane of the drawing. A valve stem 30 is arranged for reciprocation in a direction extending away from the axis 302. In the figure, it is shown at one end of its range of travel, in which it is urged against its valve seat 304.

The valve stem is connected to the rotor via a linkage. The linkage consists of an extendable resilient coupling 306, a pivot 308 and a crank 310. Coupling 306 is connected to the valve stem by an impeller 305 and a connector 307. The crank 310 extends between pivot 308 and a pivot 312 which is located on the rotor 300.

It will be appreciated that in practice the impeller and/or valve stem is intended to be constrained to move in a linear manner only, with the crank 310 converting rotation of the rotor into linear movement of the impeller.

Pivot 312 is radially offset from the rotational axis 302 of the rotor. When the rotor is in its primary rest position, which is shown in FIG. 10, pivot 312 is also rotationally offset from the location of its maximum displacement away from the valve seat 304. This rotational offset is indicated as angle "a" in FIG. 10. This angle may be 5 to 7 degrees, for example.

Figure 11:
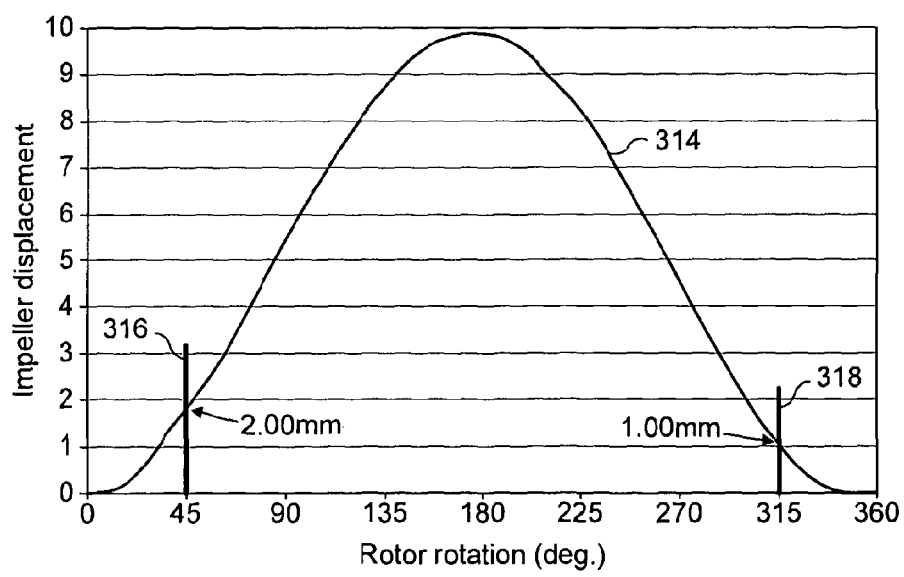
FIG. 11 is a graph of impeller displacement against rotor rotation for an actuator configured in accordance with FIG. 10.

Characteristics of the arrangements shown in FIG. 10 are illustrated by the graph of FIG. 11. In this graph, the displacement of the impeller 305 is plotted against the rotational position of the rotor. In this example, the radial distance between the axis 302 of the rotor and the pivot 312 is 6 mm.

It can be seen that between that around 340 degrees and 7 degrees of rotor rotation, there is no displacement of the impeller. This is effectively a "lost motion" portion of the rotation of the rotor. Over this portion, movement of the pivot 312 relative to the so impeller only results in changes in extension of the resilient coupling 306. During the remainder of the rotor's rotation, the resilient coupling 306 is not extended and motion of the pivot 312 is translated via the linkage into linear displacement of the impeller. Thus, as shown in FIG. 11, the impeller is moved to a maximum displacement of 10 mm at the apex of sinusoidal curve 314 before returning back to its zero displacement position. As a result of the lost motion linkage, 2 mm of the linear travel of the pivot 312 is therefore "lost".

Significantly, as the position of pivot 312 is rotationally offset from its maximum linear displacement away from the valve seat 304 when the rotor is in its primary rest position, curve 314 is similarly offset. On FIG. 11, second and third rest positions (labelled 316 and 318, respectively) are marked, corresponding to rotations of 45 degrees and 315 degrees of the rotor respectively. Although the rotor rotates through the same rotational angle from its primary rest position to the second and third rest positions, it can be seen that the impeller displacement at the second rest position 316 is 2 mm, compared to only 1 mm at the third rest position, 318. A greater proportion of the motion towards the third rest position is "lost" in the linkage between the rotor and the impeller.

In further embodiments, the resilient coupling may be provided by using a resilient crank.

The term "impeller" denotes a part of the actuator which in use engages with another component which is to be displaced by the actuator.

The resilient coupling may be in the form of a spring, such as a coil spring for example. In the lost motion portion of the rotor's rotation, the coupling is extended and therefore as a result exerts a tensile force on the valve stem, tending to hold it in its closed position against its valve seat 304. It will be appreciated that the properties of this resilient coupling may be selected as appropriate to suit a particular application and its requirements. If necessary, it could be balanced by a further resilient element which acts on the valve stem to assist lifting of the valve stem away from its seat.

Alternatively, in some implementations of actuators embodying the present invention, a further biasing arrangement (such as a spring) may be provided in association with a valve stem coupled to the actuator, to urge the valve stem towards its closed position.

Figure 12:
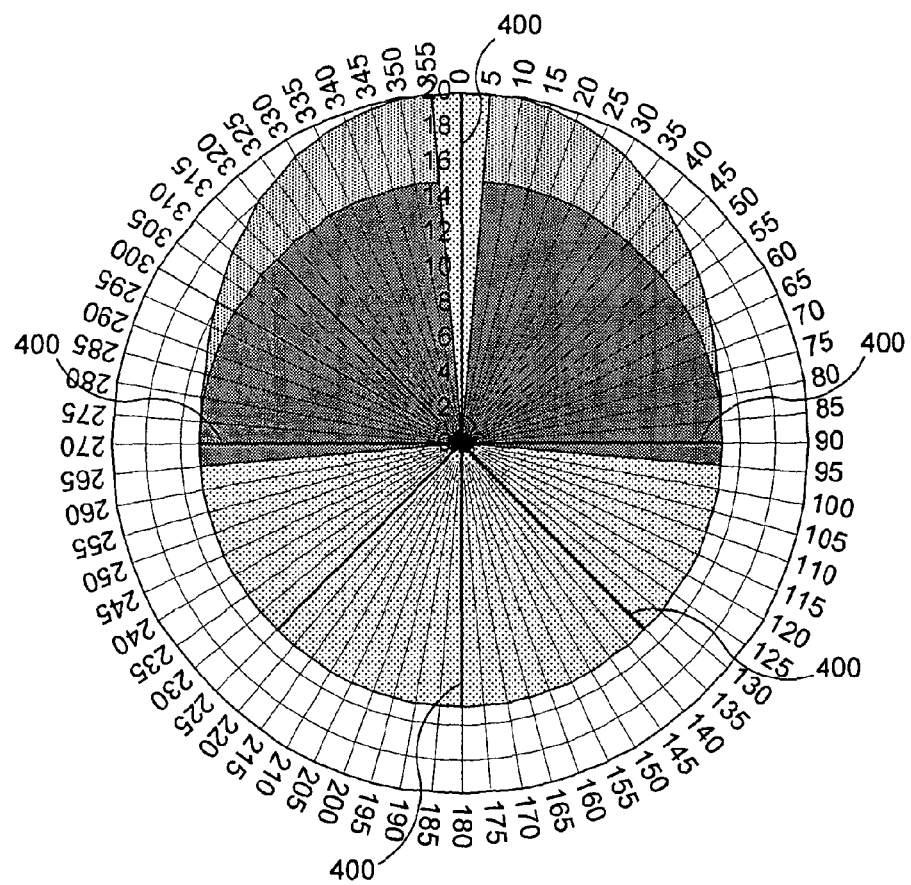
FIG. 12 represents the profile of a further bias cam surface embodying the present invention.
Figure 13:
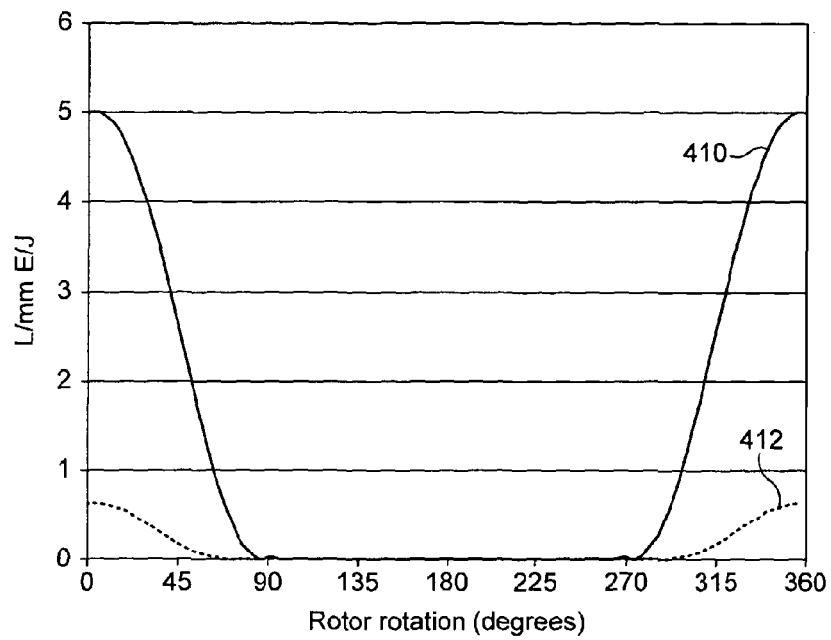
FIG. 13 is graph of spring lift and spring energy storage against rotor rotation for an actuator having a bias cam surface profile of the form shown in FIG. 12.

A bias cam surface profile according to a further embodiment of the invention is shown in FIG. 12. A corresponding graph of valve lift and energy stored in the biasing arrangement is shown in FIG. 13. The symmetrical or non-circular bias cam surface profile of FIG. 12 is divided into three zones, with the profile being symmetrical about a line extending between 0 and 180°.

The section from 90° to 270° is circular, as is the section between 255° and 5°. From 270° to 355°, the profile gradually increases in radius, whilst from 5° to 90° degrees it gradually decreases in radius. The thicker radial lines at 0°, 90°, 135°, 180°, 225° and 270° denote stable rest positions 400. Thus, for rotation of the rotor between the stable rest positions at 90°, 135°, 180°, 225° and 270°, there is no displacement of a bias cam following the radius of the surface. Furthermore, the radius is at a minimum over this portion of its profile. Consequently, in an arrangement where the force applied by a biasing arrangement is dependent on this radius, the force is at a minimum over this portion of the rotor's rotation. Thus, whilst a corresponding bias cam follower is in engagement with this portion of the bias cam surface profile, any friction between the bias cam follower and the cam surface will be at a minimum. When the bias cam follower is biased using a mechanical spring arrangement, this portion corresponds to minimum deflection of the spring element. If the actuator operates for the majority of the time in this region, then the lifetime of the spring element will be longer.

The graph of FIG. 13 plots spring lift, L (plot 410) and the energy stored in the spring, E (plot 412) against rotor rotation for an actuator embodiment including a bias cam of the form shown in FIG. 12. It can be seen that from 90° to 270° degrees, the valve lift and energy storage is zero. Both parameters increase from zero at 270° to a maximum at 360°/zero degrees before then falling again to zero at 90°. Thus, energy storage and release from the spring only occurs between 270° and 90°. In other embodiments this region may be narrower. For example, it may extend from around 290° to 70°.

Figure 14:
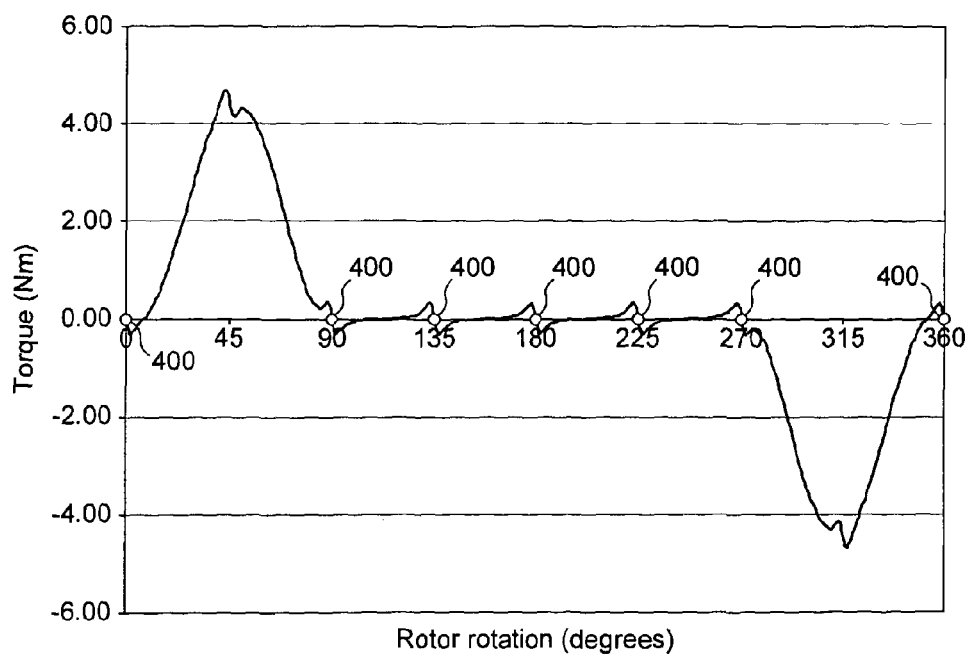
FIG. 14 is a graph of total rotor torque against rotor rotation for an actuator having a bias cam surface profile of the form shown in FIG. 12.

A plot of the total rotor torque against its rotational position corresponding to the configuration of FIGS. 12 and 13 is shown in FIG. 14. It can be seen that the bias cam profile of FIG. 12 facilitates provision of stable rest positions 400 as shown in FIG. 14, defined by passive magnetic force between the rotor and the stator.

Figure 15:
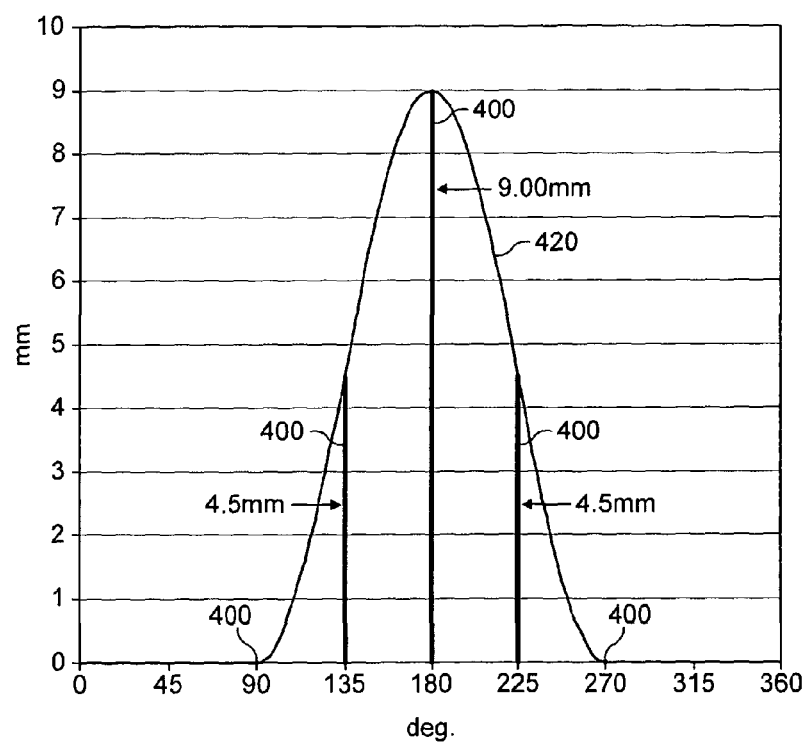
FIG. 15 is a graph of valve lift against rotor rotation for an actuator according to a further embodiment of the present invention.
Figure 16:
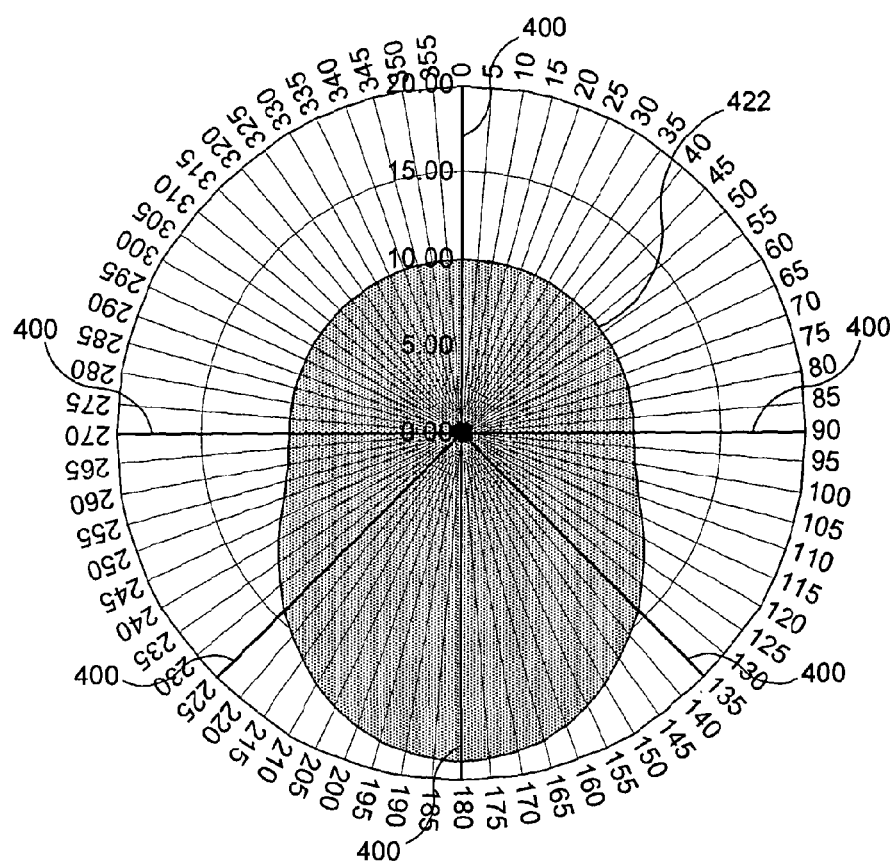
FIG. 16 represents an actuation cam surface profile corresponding to the valve lift graph of FIG. 15.

An actuation cam displacement graph and cam profile 422 for use in combination with the bias cam profile of FIG. 12 are depicted in FIGS. 15 and 16, respectively. It can be seen that the displacement is zero between 270° and 90°. Continuing clockwise from 90°, it increases to a maximum at 180° before then decreasing again down to zero at 270°.

In this configuration, one or more of the rotor positions at 90°, 180° and 270° may be denoted as primary rest positions. Each of these stable rest positions 400 at 135°, 180° and 225° may represent "second rest positions" in the context of the present application.

An actuator having cam surface profiles as illustrated in FIGS. 12 to 16 may be deployed in combination with a valve stem of an engine. In that case, during low and medium rpm operation, the rotor may reciprocate from either of the primary rest positions at 90° and 270° and the adjacent stable rest positions at 135° and 225°, respectively, and/or the maximum valve lift rest position at 180°. This reciprocation may involve a dwell period at the position of partial or full valve lift as appropriate. Alternatively, the actuator may operate in a "bouncing mode" in which there is continuous movement to any angular position between 90° and 270° to achieve a desired lift and then back to a primary rest position, without a dwell period. This facilitates provision of a secure low flow throttle-free mode.

During high rpm operation, the actuator rotor may be controlled to rotate continuously through full revolutions thereby energising and de-energising the biasing arrangement.

Provision of primary rest positions at both 90° and 270° degrees enables operation in any of the modes described above by rotation in either direction (clockwise or anticlockwise), with the most appropriate mode being selected according to engine demand and valve driving strategy.

Figure 17:
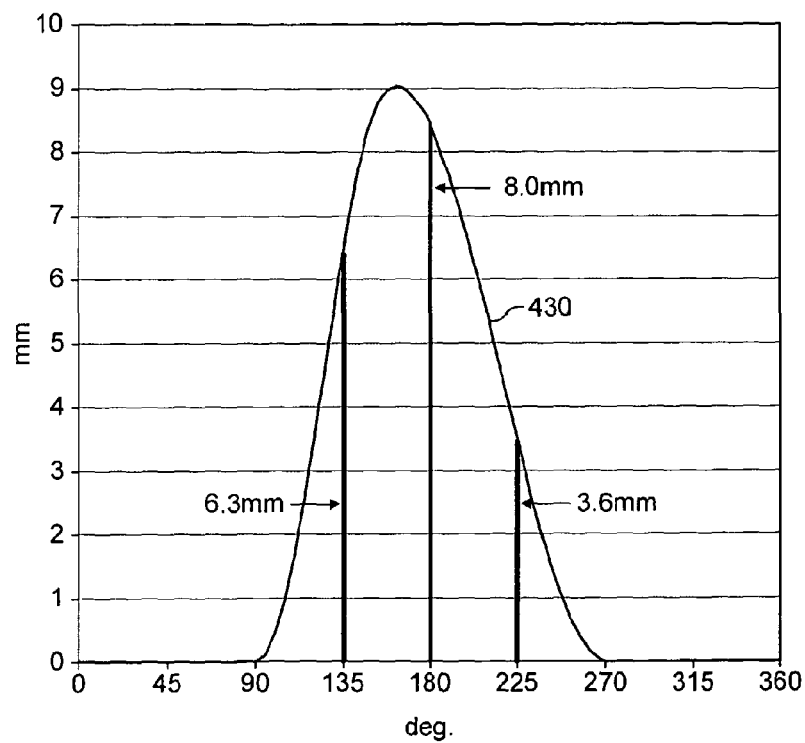
FIG. 17 is a graph of valve lift against rotor rotation for another actuator embodying the invention.
Figure 18:
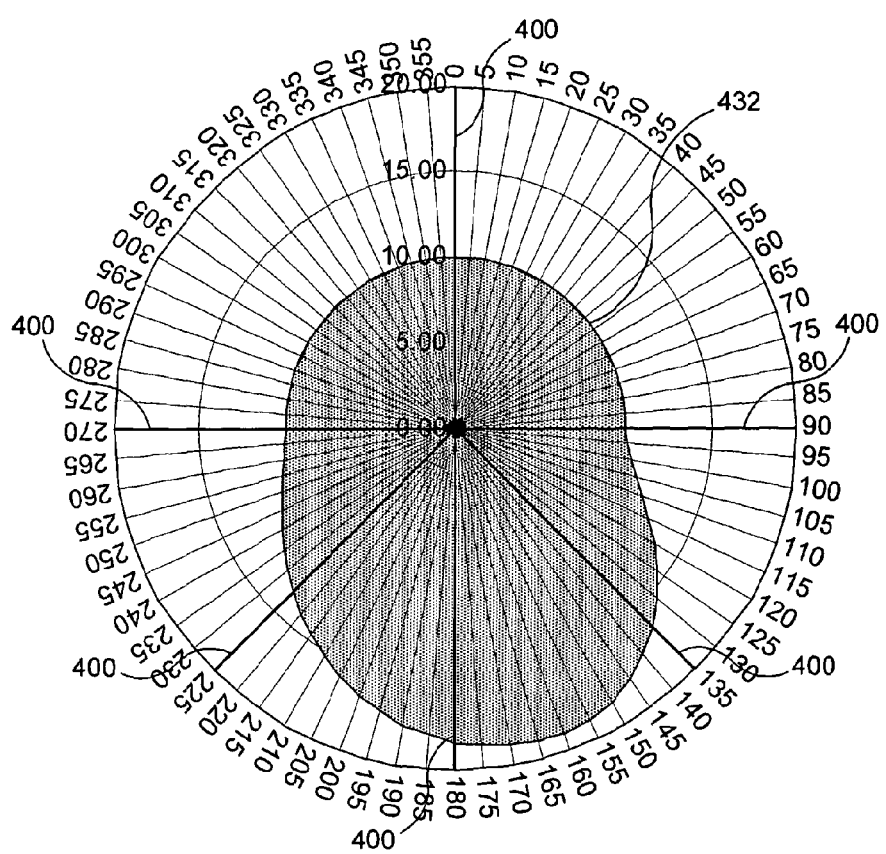
FIG. 18 represents an actuation cam surface profile corresponding to the valve lift graph of FIG. 17.

A modified impeller displacement profile 430 is plotted in FIG. 17, and a corresponding actuation cam profile 432 is shown in FIG. 18. They differ from their counterparts in FIGS. 15 and 16 in that the actuation cam profile is asymmetrical about a line extending from 0° to 180°, such that different partial lifts are achieved at the stable rest positions at 135° and 225°, respectively. In addition, the maximum displacement is achieved to one side of 180°, at around 160°. This enables the actuator to be controlled to achieve a dwell time at a partial displacement selected from the two alternatives provided at 135° and 225°, reciprocating back to the adjacent primary rest position at 90° and 270°, respectively. The stable rest position at 180° corresponds to a displacement of around 8 mm.

From reading the present disclosure, other variations and modifications will be apparent to persons skilled in the art. Such variations and modifications may involve equivalent and other features which are already known in the design, manufacture and use of electromagnetic actuators and which may be used instead of or in addition to features already described here.

The invention claimed is:

1. An electromagnetic actuator comprising:
   a rotor;
   a stator, with the rotor arranged for rotation in the stator;
   a biasing arrangement for applying a torque to the rotor during at least part of its rotation,
   wherein a plurality of stable rest positions for the rotor are defined by forces acting on the rotor, and the actuator is controllable to move the rotor from one stable rest position to another, and
   the torque applied by the biasing arrangement varies with the rotational position of the rotor such that at a primary rest position and at least a second rest position it is sufficiently low to enable selection of those positions, and then it increases beyond the second rest position.

2. An actuator of claim 1, wherein the torque applied by the biasing arrangement at the primary rest position and second rest position is substantially equal to zero.

3. An actuator of claim 1, wherein the second rest position is adjacent to the primary rest position.

4. An actuator of claim 1, wherein the actuator is coupled to a valve having open and closed positions, the actuator is operable to move the valve between its open and closed positions, and the primary rest position corresponds to the valve closed position.

5. An actuator of claim 1, wherein the biasing arrangement is a mechanical biasing arrangement.

6. An actuator of claim 1, wherein the biasing arrangement comprises:

a bias cam defining a bias cam surface; and a bias cam follower, with the bias cam follower and bias cam surface urged together, and one of the bias cam and the bias cam follower being rotatable with or by the rotor.

7. An actuator of claim 6, wherein the bias cam surface is profiled such that the displacement of the bias cam follower is substantially constant between the primary rest position and the second rest position.

8. An actuator of claim 1, wherein the primary and second rest positions are only defined by magnetic forces acting on the rotor.

9. An actuator of claim 1, wherein the force applied by the biasing arrangement on the rotor varies with the rotational position of the rotor such that it is at or substantially at its minimum at and between the primary and second rest positions.

10. An actuator of claim 9, wherein the biasing arrangement is configured to store energy during a portion of travel of the rotor beyond the second rest position, and then uses the stored energy to accelerate the rotor in the same direction to return to its primary rest position.

11. An actuator of claim 1, wherein an impeller is coupled to the rotor via a linkage.

12. An actuator of claim 11, wherein the linkage is arranged such that the impeller is in a first impeller position when the rotor is in its primary rest position, and is at substantially its maximum displacement from the first impeller position when the rotor is in its second rest position.

13. An actuator of claim 12, wherein the linkage is arranged such that the impeller returns to the first impeller position during rotation of the rotor beyond the second rest position.

14. An actuator of claim 13, wherein the linkage is arranged such that the impeller returns to the first impeller position during rotation of the rotor beyond the second rest position, before the rotor reaches the portion of its travel during which the biasing arrangement stores energy.

15. An actuator of claim 1, wherein a third rest position for the rotor is defined at a location reached by rotating the rotor in the opposite direction to the second rest position, and the torque applied by the biasing arrangement is substantially equal at the second and third rest positions.

16. An actuator of claim 6, wherein the bias cam follower and bias cam surface are urged together by a biasing element, which element is arranged to store energy during a portion of travel of the rotor towards the primary rest position and to accelerate the rotor during a portion of its travel away from the primary rest position.

17. An actuator of claim 6, wherein the primary rest position corresponds to one end of the travel of the bias cam follower.

18. An internal combustion engine including an actuator of claim 1 arranged to actuate a valve.

* * * * *